Inventor
Bernard J. Daveau
by Michael S. Striker
Atty

Inventor
Bernard J. Daveau
by Michael J. Striker
Atty

Inventor
Bernard J. Daveau
by Michael J. Striker
Atty

United States Patent Office 3,286,202

Patented Nov. 15, 1966

3,286,202

COUPLER FOR DISTRIBUTING MICROWAVE ENERGY AMONG A PLURALITY OF TERMINALS

Bernard J. Daveau, Chatillon-sous-Bagneux, France, assignor to Compagnie Francaise Thomson-Houston, Paris, France, a French body corporate Filed Oct. 26, 1964, Ser. No. 406,445
Claims priority, application France, Oct. 24, 1963, 951,623, Patent 1,380,714
19 Claims. (Cl. 333—7)

This invention relates to microwave systems in which the wave energy is to be coupled between a first terminal and a set of at least two second terminals, that is from a single input to a plurality of outputs, or from a plurality of inputs to a single output.

Objects of this invention are to provide such microwave systems in which the transfer of energy will be effected in full, substantially without losses, and without affecting the matching characteristics between the input and output energies. Further objects are to provide new and improved variable couplers for microwave energy, for varying the distribution of the energy between a plurality of (e.g. output) terminals, while maintaining matched conditions between the input and output throughout such variations. Coupling devices according to the invention will be applicable to a large number of purposes and can be incorporated in a wide range of microwave equipment, some examples being power-dividers, progressively variable switches, cyclic feeders, scanners for radar antennas, and the like.

Exemplary embodiments of the invention will now be described for purposes of illustration but not of limitation with reference to the accompanying drawings, wherein.

All the figures are highly schematic. Similar references are used throughout the figures to indicate corresponding parts.

Figure 1:
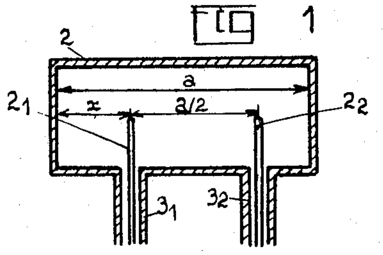
FIGURES 1 and 2 are a horizontal and a transverse cross sectional views, respectively, of a device constructed in accordance with the invention.
Figure 2:
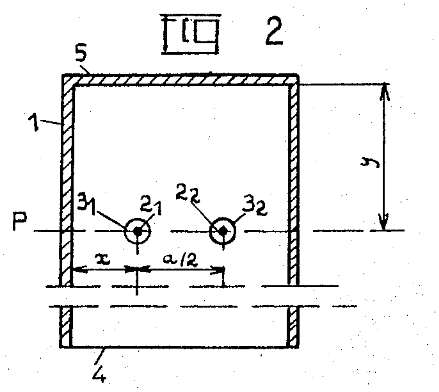

There is shown in FIGURES 1 and 2 a rectangular waveguide 1 having an input end 4 which may be connected to any suitable power source, e.g. by way of a coaxial line, not shown, and a sealed or short-circuited energy-reflecting end 5. It is desired to transfer the energy applied to the input end 4 of the guide to a pair of similar loads for the fundamental mode of energy propagated through the guide. For this purpose the invention provides a pair of coupling probes $2_1$; $2_2$ projecting into the waveguide through a side wall thereof in coaxial conduits $3_1$; $3_2$ and having their outer ends connected to the respective loads, not shown. The probes are positioned on a common transverse plane P of the waveguide, i.e. at a common distance $y$ from the energy-reflecting end 5 of the guide, and they are identical.

In accordance with a finding on which this invention is largely based, it has been found possible so to dispose a plurality of two or more probes in a waveguide, that the transfer of energy between the waveguide and the probes will be effected in a substantially complete manner, i.e. that the energy in the guide will substantially equal the sum of the energies in the probes, and furthermore so that the characteristics of energy matching between the input and output shall not be affected by variations in the bodily position of the probes across the waveguide section, or by variations in frequency within the operative range.

Specifically, when two probes are used as in FIGURES 1 and 2 it has been found that if the spacing of the probes $2_1$ and $2_2$ from each other is $a/2$, where $a$ is the width of the waveguide sidewall as indicated, then the impedance matching characteristic is independent of the bodily positioning of the pair of probes $2_1$, $2_2$ across the plane P. In other words, if the pair of probes $2_1$, $2_2$ were to be displaced bodily together across the waveguide section, so that the distance $x$ as indicated in FIGURES 1 and 2 is varied arbitrarily, then provided the mutual spacing between the probes retains the constant value $a/2$, the reflection coefficient for the energy as measured at the input 4 of the guide also remains constant. The effect is reversible, so that either the waveguide can be used as the single energy input and the two probes as the outputs, or the probes can be used as two inputs and the waveguide as the single output.

As a consequence of the above, if the distance $y$ of the common plane P of the probes from the energy-reflecting end wall 5 is suitably selected in regard to the other relevant characteristics of the waveguide system so that the input and output circuits are matched for any one value of the distance $x$ (that is, for any one position of the pair of probes on the transverse plane P), the matched condition will subsist for all values of $x$ (for all positions of the pair of probes in the plane P), provided the inter-probe spacing remains equal to $a/2$.

It is also found that in the matched condition of the system, the input energy delivered to the waveguide at 4 is completely distributed between the two loads. The distribution of energy between the two probes of course depends on the bodily position of the pair of probes $2_1$, $2_2$ in the waveguide, i.e. on the value of $x$. The components of output energy distributed through the respective probes $2_1$, $2_2$ to the two loads are given by the following expressions, in terms of the distances $x$ and $a$:

$$P_1=P_0\left(\sin\frac{\pi x}{a}\right)^2$$
$$P_2=P_0\left(\cos\frac{\pi x}{a}\right)^2 \qquad (1)$$

in which $P_0$ is the power delivered to the input 4, and $P_1$ and $P_2$ are the components of power available at the probes $2_1$ and $2_2$ respectively and applied therethrough to their respective loads. By combining the two Equations 1 it is immediately apparent that $P_1+P_2=P_0$ indicating that the partition of the input energy between the two probes and the associated loads is complete, since the sum of the output energies equals the input energy.

The remarkable properties just set forth are capable of various useful applications in the construction of novel and advantageous waveguide couplers, switches and other microwave equipment wherein energy is to be transferred between a first terminal and more than one other second terminals.

Figure 3:
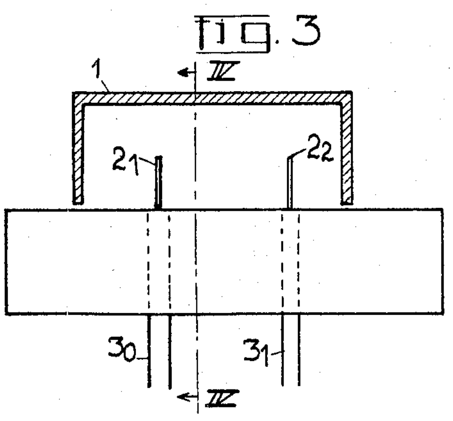
FIGURES 3 and 4 are a transverse and a longitudinal (vertical) sectional views of a variable coupler according to the invention, FIGURE 4 being a section on line IV of FIGURE 3, and FIGURE 3 a section on line III of FIGURE 4.
Figure 4:
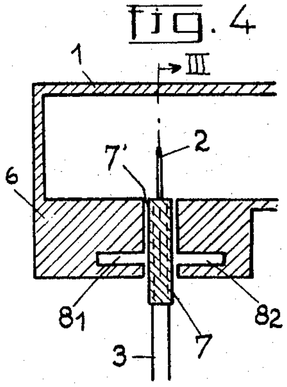

Thus, FIGURES 3 and 4 illustrate a variable microwave power divider device including a rectangular waveguide section 1 having a bottom wall 6 of increased thickness and formed with a transverse slot 7' therein. A strip 7 is slidable in the slot, being supported by means not shown, and has a pair of probes $2_1$ and $2_2$ projecting from the top thereof into the waveguide. The probes extend through respective coaxial conduits 31 and 32 extending in suitable tubular orifices of the strip 7, and are externally connected to load circuits not shown. Preferably, side slots $8_1$ and $8_2$ connecting with the slot 7' constitute traps for reducing energy leakage. In the operation of this device, when the strip 7 is shifted in its slots through any suitable actuating means, manual or otherwise, the proportion of input energy delivered to the two coaxial lines comprising the probes $2_1$ and $2_2$ and their conduits $3_1$ and $3_2$ is varied continuously in accordance with the Equations 1 and throughout any such displacements the matched character of the energy coupling remains unaffected. The amplitude phase relationships remain unaltered.

Figures 5, 6, 7, 8:
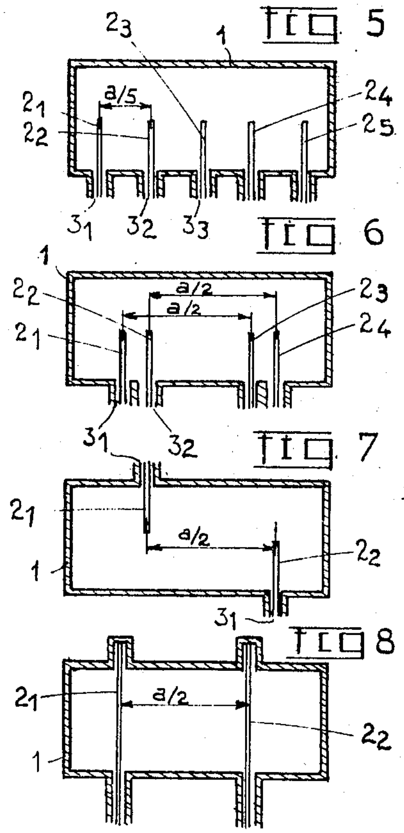
FIGURES 5 through 9 illustrate cross sectional views of respective further embodiments of the invention.

The invention is not restricted to microwave couplers wherein the energy is coupled between a waveguide and only two lines. The number of such lines can be greater than two, say $n$, and in such case according to the invention the spacing between the $n$ probes should preferably be made equal to $a/n$ (where $a$ is the width of the waveguide as before) in order that the matching characteristics between the input and outputs shall remain unaffected by the bodily position of the probes. FIGURE 5 illustrates such a microwave coupler according to the invention in which there are provided five probes $2_1$ through $2_5$ arranged within the rectangular guide 1, with the inter-probe spacing being $a/5$ where $a$ is guide width as indicated. The arrangement of each probe may be generally similar to that described with reference to FIGURES 1 and 2.

In the general case where there are $n$ probes spaced $a/n$ apart, the energy distribution between the probes is given by the following expression for the output power $P_i$ delivered to the $i$th probe, where $i$ takes on all integral values from 1 to $n$ inclusive:

$$P_i=\frac{2}{n}P_0\sin^2\left(\frac{\pi x}{a}+(i-1)\frac{\pi}{n}\right) \qquad (2)$$

with $$\sum_{i=1}^{n}P_i=P_0$$

While in accordance with the basic teaching of the invention the spacing between the probes should generally be uniform, in certain cases this uniform spacing may be provided between the probes of each of a plurality of separate groups of probes provided in the waveguide, with the probes being non-uniformly spaced as between different groups. This possibility is illustrated by way of example in FIGURE 6, in which there are illustrated two groups of two probes. Thus, the probes $2_1$ and $2_3$ of a first group of two are uniformly spaced by the distance $a/2$, and the probes $2_2$ and $2_4$ of a second group of two are uniformly spaced by the distance $a/2$. However, the probes $2_1$ and $2_2$ are spaced a distance differing from $a/2$, and the probes $2_3$ and $2_4$ are also separated by this distance. The resulting over-all power distribution between the various probes is then somewhat more complex than in the preceding instances, but can be readily determinal.

FIGURES 7 and 8 are presented to illustrate the fact that provided the teaching as to the spacing between the probes is preserved, the actual arrangement of the probes in the waveguide may take various forms. Thus in FIGURE 7, the two probes $2_1$ and $2_2$ shown, instead of being inserted from different points of the same side wall of the rectangular guide, are inserted through opposite side walls thereof. Otherwise the arrangement is similar to that in FIGURE 1. In FIGURE 8, the two probes $2_1$ and $2_2$ are shown as being supported from both opposite ends thereof in the opposite side walls of the guide.

In a microwave coupler according to the invention, the waveguide is not necessarily rectangular. Other cross sectional shapes may be used, provided the shape is such that it admits of defining a uniform distribution of the probes within the guide in such a manner that the spacing between the guides is a definite fraction of a dimension of the guide as specified herein.

Figure 9:
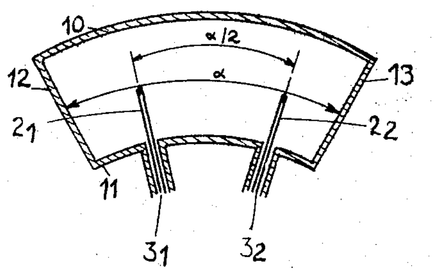

Thus, the general relationship taught by the invention $$e=a/n \qquad (3)$$

where $e$ is the inter-probe spacing, $a$ the relevant waveguide dimension and $n$ the number of probes, holds for the case where the spacings $e$ and $a$ are angular rather than linear magnitudes. This is illustrated in FIGURE 9 which shows a waveguide 1 having two concentric part-cylindrical opposite sidewalls 10 and 11 bounded by two radial sidewalls 12 and 13. There are here shown two probes $2_1$ and $2_2$ which are made to extend radially with respect to the arcuate sidewalls 10 and 11. The angular spacing between the two probes is one half the angular spacing $\alpha$ between the radial side walls 12 and 13.

Figure 10:
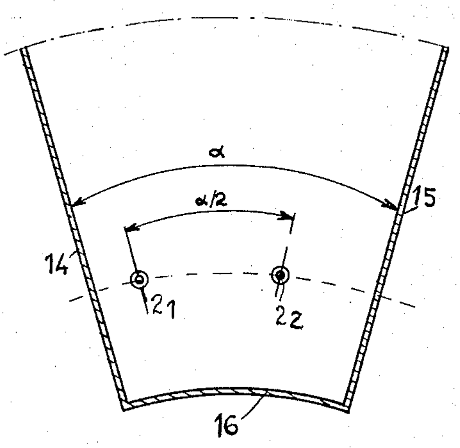
FIGURE 10 is a longitudinal sectional view of an embodiment, on a plane normal to the coupling probes.

Another modification is shown in FIGURE 10, which is a plan view showing a waveguide of a shape, in plan, having divergent sidewalls 14 and 15 and an arcuate short-circuit end wall generally cylindrical and coaxial with the intersection of the diverging sidewalls 14, 15. In this case, the probes such as $2_1$ and $2_2$ (shown only two in number but which may be provided in any number greater than two as desired), and disposed to lie on a common cylindrical surface coaxial with the arcuate end wall 16, with the angular probe spacing being again one half the angle defined by the side walls 14 and 15.

Figures 11, 12:
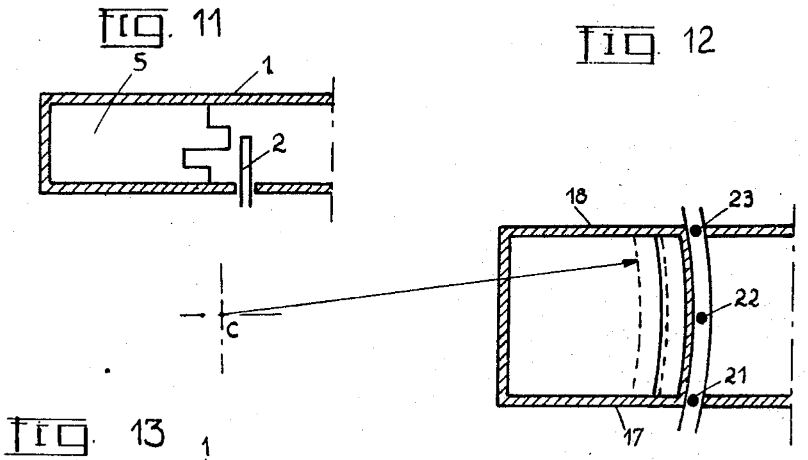
FIGURES 11 and 12 are longitudinal sectional views, respectively parallel and normal to the direction of the probes, of another modification of the invention.

A variant of this last modification is illustrated in FIGURES 11 and 12, which show a rectangular waveguide 1 having a plurality of probes $2_1$, $2_2$, $2_3$ disposed in it on the generatrices of a common cylindrical surface as in FIGURE 10. In this case however, the side walls 17 and 18 parallel to the common direction of the probes are not divergent as in FIGURE 10 but are parallel. Experience has shown that a coupling system thus constructed will operate satisfactorily provided the short circuiting wall 5 sealing the reflecting end of the waveguide is a surface of revolution coaxial with the centre axis C of the cylindrical surfaces along which the probes $2_1$, $2_2$ . . . are disposed, as shown in FIGURE 12. Preferably moreover, said reflecting wall 5 should be profiled in a manner generally shown in FIGURE 11, where it is seen that the profile of the terminal surface of said wall 5 is castellated and includes a projection adjacent to the free extremity of the probes 2 within the waveguide, and a depression near the lower part of the probes. The precise shape of this profile is determined by trial and error so as to ensure satisfactory impedance matching in the transfer of energy through the coupler over a broad frequency band.

Figure 13:
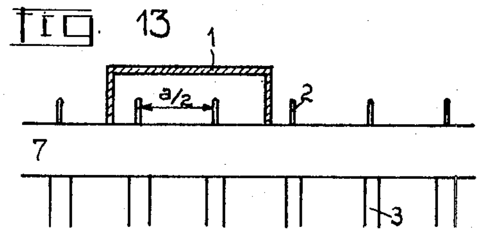
FIGURE 13 is a view of another variable coupler, of the continuous switching type, on a transverse plane.

FIGURE 13 illustrates a form of the invention in which the variable microwave coupler is used as a continuously variable power-switching or feeding device. The device shown in FIGURE 13 is largely similar to the variable coupler described above with reference to FIGURES 3 and 4, except that the slidable strip 7 is substantially extended in length, and has a plurality of probes 2 projecting therefrom at a uniform spacing equal to one half the width of the waveguide 1 across which the strip 7 is slidable. It will thus be apparent that as the strip 7 is displaced across the waveguide, the coupling of energy from the waveguide will be effected to each pair of probes 2 (and associated coaxial lines 3 and loads) in succession, to provide a continuously variable or progressive switching effect.

Figure 14:
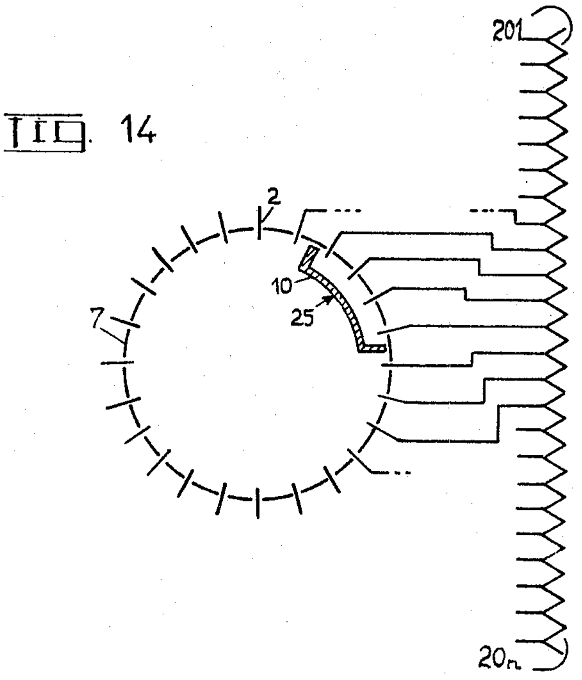
FIGURE 14 is a cyclic variable coupler of the continuous switching type, used as a scanning feeder for a radar antenna array.
Figure 15:
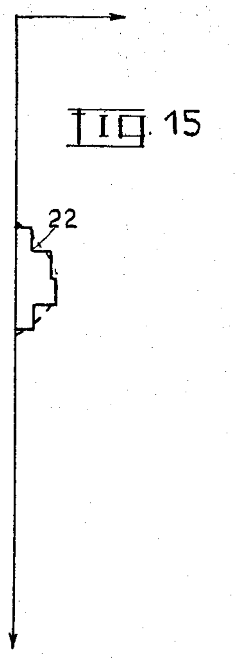
FIGURE 15 is a graph showing the energy distribution in the feeder of FIGURE 14.

A modification of such a continuously variable switching device is illustrated in FIGURES 14 and 15 as applied to a feeder device for a multi-horn radar antenna system. In this case there is provided a circular strip 7, here shown stationary, and having a plurality of probes projecting radially outward therefrom. The probes 2 around the circular strip or support member 7 are connected, preferably by way of coaxial lines, to successive horns $\mathbf{20}_1$ through $\mathbf{20}_n$ of an array of $n$ horn antennas. The number $n$ of horns in the antenna array is equal to the number of probes 2 provided around the support 7. The feeder system further includes a movable distributor member 25 in the form of a waveguide section of a general transverse shape similar to the one described with reference to FIGURE 9. The angular extent of the arcuate wall 10 of the waveguide 21 is in this example selected equal to four times the angular spacing between adjacent radial probes 2 around the circular supporting frame 7. When distributor member 25 is rotated, through means not shown, around the circular frame 7 about the center of the circumference, energy is transferred from an input, not shown, of the distributor waveguide member 25 to a group of four consecutive antenna horns 20, so as to feed the input energy to all four horns of the group at a time. The graph 22 in FIGURE 15 shows the manner in which the input energy is distributed among the four horns of the group being fed at any particular time. As member 25 is rotated continuously round frame 7, this energy distribution curve moves to and fro across the antenna array, thus providing a rapid scanning action.

It will be understood that various modifications of the exemplary embodiments disclosed, and various applications of the invention other than those specifically mentioned, may be conceived within the scope hereof. An essential teaching of the invention resides in the discovery of a definite relationship between two or more energy probes provided in a waveguide, and the transverse dimension of the waveguide wall into which the probes project, which relation, if satisfied, will ensure that the transfer of energy from the waveguide to the probes (and vice versa) will remain effective without any change in the impedance matching characteristics (and hence amplitude and phase) of the input and output energies, regardless of the bodily position of the probes across said transverse wall.

While it is apparent that this broad teaching will lead to a great number of useful applications in which the whole array of two or more probes is made displaceable, as a whole, relatively to the waveguide, as in the forms of the invention shown specifically in FIGURES 3–4, FIGURES 11–12, FIGURE 13 and FIGURES 14–15, it is emphasized that in certain embodiments of the invention no relative displacement need be present between the array of probes and the waveguide member, i.e. as indicated by way of example in FIGURES 1–2, and in each of FIGURES 5 to 10. For example, the invention in this static aspect may be applied to construct a useful standard power divider, e.g. for measuring purposes. Such a device would be generally similar to the structure shown in FIGURES 1–2, being associated with a microwave power generator delivering a power $P_0$ to the input 4 of the waveguide, e.g. through a coaxial line. With the output power being distributed to the two similar loads connected to coaxial lines $\mathbf{3}_0$ and $\mathbf{3}_1$ in accordance with the Equation 1 written above, it will be apparent that the ratio between the two output power values is $$\frac{P_1}{P_2}=\tan^2\frac{x}{a}$$

This equation shows that the power distribution depends only on the geomtery of the system not on frequency or other factors. Various other useful applications and embodiments are conceivable.

What I claim is:

1. In a microwave system, an arrangement for transferring microwave energy between a first terminal and a plurality of at least two second terminals, comprising a waveguide member having a sealed energy-reflecting end wall, an opposite end wall, and side walls; means connecting said first terminal with said opposite end wall of the member; a plurality of at least two energy-coupling probes projecting into the waveguide member normally to sidewall thereof; said probes being positioned on a common surface parallel to said energy-reflecting end wall of the member; the spacing between at least certain of said probes being substantially equal to the transverse dimension of said sidewall divided by the number of probes in said plurality; and means connecting each probe to a respective one of said second terminals.

2. A microwave structure for transferring microwave energy between a first terminal and two second terminals comprising a waveguide member having a sealed energy reflecting end wall and an opposite end wall and sidewalls; means connecting said first terminal with said opposite end wall; two probes projecting into the member normally to a sidewall, thereof; said probes positioned on a common surface parallel to said energy reflecting end wall; the spacing between said probes being one half the transverse dimension of said sidewall; and means connecting each probe to a respective one of said second terminals.

3. Structure as defined in claim 1, wherein said waveguide is rectangular.

4. Microwave energy transfer structure comprising a waveguide member having a part-cylindrical energy-reflecting end wall, an opposite end wall and side walls; means connecting a first terminal with said opposite end wall of the member; a set of at least two energy-coupling probes projecting into the waveguide member normally to a side wall thereof and lying substantially on a part-cylindrical surface parallel to said first surface and spaced therefrom; and a set of second terminals respectively connected to said probes for substantially total energy transfer between said first terminal and said set of second terminals.

5. The structure defined in claim 4, wherein said sidewalls include a pair of opposite sidewalls parallel to said probes and diverging longitudinally of the guide along angularly-spaced radial planes of said cylindrical surfaces.

6. The structure defined in claim 4, wherein said reflecting end wall has a castellated profile adjacent said probes.

7. Microwave energy-transfer structure comprising a waveguide member having a pair of first opposed sidewalls in the form of coaxial part-cylindrical surfaces, a pair of second opposed sidewalls in the form of planes radial to said part-cylindrical surfaces, a sealed energy-reflecting end wall and an opposite end wall; means connecting said opposite end wall to a first terminal; a set of at least two energy-coupling probes projecting into the waveguide member along spaced radii of said part-cylindrical surfaces and lying on a common surface substantially parallel to said energy-reflecting end wall and spaced therefrom; and a set of second terminals respectively connected to said probes for substantially total energy transfer between said first terminal and said set of second terminals.

8. The structure defined in claim 7, wherein the angular spacing between said probes substantially equals the angular spacing of said second opposed sidewalls of the waveguide member divided by the number of probes.

9. A variable coupler for microwave energy comprising a waveguide member; a first terminal connected in energy-coupling relation with said member; means supporting a series of spaced energy-coupling probes projecting therefrom the spacing between adjacent probes being not greater than half the width dimension of the waveguide member; means connecting the probes with respective second terminals; and means for relatively displacing said supporting means and member in a direction generally parallel to said series of probes and transverse to said waveguide member and with said probes projecting into the member through a sidewall thereof, whereby variably to couple energy between said first terminal and said set of second terminals.

10. A variable coupler as defined in claim 9, wherein the spacing between said probes along the supporting means is an integral submultiple of the width dimension of the waveguide member.

11. Variable microwave energy coupling structure comprising a waveguide member; a first terminal connected in energy-coupling relation with said member; elongated supporting means extending transversely of the waveguide member and having a series of spaced energy-coupling probes projecting therefrom with the spacing between probes being not more than half the width dimension of said member and the longitudinal extent of said series being substantially greater than said width dimension, whereby at least two adjacent probes in the series will simultaneously project into the waveguide member; means connecting said probes with respective ones of a set of second terminals; and means for relatively displacing said supporting means and waveguide member in a direction parallel to said series and transverse to said member with said probes projecting into the member through a sidewall thereof, whereby to provide a cyclically variable coupling of energy between said first terminal and consecutive subsets of said set of second terminals.

12. The structure defined in claim 11, wherein the spacing of the probes in said series is an integral submultiple of said width dimension of the member.

13. The structure defined in claim 11, wherein said elongated supporting means comprises a stationary circumferential frame member and said waveguide member is rotatable around the circumference of said frame member.

14. The structure defined in claim 13, wherein said first terminal is connected to a source of radar power and said set of second terminals are connected to an array of radar antenna elements.

15. A microwave energy transferring system comprising a waveguide member having an energy input end wall, an energy-reflecting end wall spaced from the input end wall, and sidewalls; means connecting said input end wall with an energy input terminal; a set of at least two energy-coupling probes projecting into the member normally to a sidewall thereof and lying on a common surface parallel to said energy-reflecting end wall and intermediate both said end walls; and a set of output terminals respectively connected to said probes, for distributing said input energy between the output terminals of said set.

16. The structure defined in claim 15, wherein said common surface is so positioned relatively to said end walls that said intput and output energies are substantially matched.

17. The structure defined in claim 15, wherein said connecting means comprise coaxial line means.

18. The structure defined in claim 1, wherein said connecting means comprise coaxially line means.

19. The structure defined in claim 1, wherein said common surface is so positioned that the energies at said first terminal and at said set of second terminals are substantially matched.

References Cited by the Examiner

UNITED STATES PATENTS

| | | | |
|---|---|---|---|
| 2,842,665 | 7/1958 | Hopfer | 329—161 |
| 3,239,713 | 3/1966 | Evans | 333—21 |

HERMAN KARL SAALBACH, *Primary Examiner.*

L. ALLAHUT, *Assistant Examiner.*